March 17, 1964     E. W. KAISER     3,125,056
METHOD OF MAKING CAN BODIES

Filed March 9, 1961     2 Sheets-Sheet 1

INVENTOR.
EDWARD WILLIAM KAISER
BY Robert P. Auber
George W. Reiber
ATTORNEYS

March 17, 1964  E. W. KAISER  3,125,056
METHOD OF MAKING CAN BODIES
Filed March 9, 1961  2 Sheets-Sheet 2

INVENTOR.
EDWARD WILLIAM KAISER
BY Robert P. Auber
George W. Reiber
ATTORNEYS

United States Patent Office 3,125,056
Patented Mar. 17, 1964

---

3,125,056
METHOD OF MAKING CAN BODIES
Edward William Kaiser, Palatine, Ill., assignor to American Can Company, New York, N.Y., a corporation of New Jersey
Filed Mar. 9, 1961, Ser. No. 94,524
5 Claims. (Cl. 113—120)

The present invention relates to can body manufacture and more particularly to an improved method of making metal can bodies having a cemented interlocked hook type side seam.

Metal can bodies have heretofore been commercially produced having cemented lock seams. Normally, the procedure used involves forming a flat sheet metal blank into a somewhat tubular shape with the longitudinal edge portions being bent into reversely disposed body hooks in the conventional manner. A ribbon or bead of a heated thermoplastic material is then extruded on to one of the body hooks, generally the outwardly bent hook. While the thermoplastic material is still in the heated and softened state, the body hooks are engaged and bumped tightly together to interlock the hooks and force the cement to flow between and, upon setting, to bond the adjacent surfaces of the interlocked hooks.

While the method presently used is satisfactory for cements of the so called hot-melt variety which usually consist wholly of a blend of resins and plasticizers, the method is not readily adaptable for use with bonding materials having a solvent base, e.g., a cement consisting of the adhesive dissolved in an organic solvent. Generally, the fluid solvent base cements must be pre-applied to the longitudinal margins which are to be enclosed within the lock seam and the volatile solvent removed by evaporation before the seam is formed. In the subsequent bumping operation whereby the body hooks are interlocked, the solid adhesive material remaining after the evaporation of the solvent tends to resist movement and therefore may not become uniformly distributed throughout all parts of the seam. Consequently, the strength developed by the seam is not uniform along its length and does not have the maximum value attainable with the particular bonding material.

A method which has been proposed to overcome the above deficiency requires the additional steps of simultaneously subjecting the interlocked seam to a light pressure and heating the seam to soften the bonding material enclosed therein, and then passing the heated seam through a series of pressure and cooling rollers to press the hooked portions tightly together while the bonding material is being cooled to the solid state. While this proposed method may effect an improvement in the distribution of the bonding material within the seam by forcing it to flow into and fill the spaces between the interlocked hook portions, the rolling of the heated seam has the tendency to squeeze the softened bonding material longitudinally backward along the seam. Under such a circumstance, the portion of the seam passing initially through the pressure rollers will have a relatively smaller proportion of the bonding material enclosed therein as compared to the portion of the seam which goes through the rollers last. When this occurs, it results in unequal thicknesses of bonding material joining adjacent surfaces along the length of the seam which may cause variations in the strength of the seam along its length.

Furthermore, in the manufacture of cemented side seam cans, considerable difficulty has been encountered in producing a sufficiently tight joint in the seam portions of the body ends which are flanged and double seamed to end closure members. In the usual flanging operation, the edge portions of the can body are expanded and rolled outwardly under the action of a flanging die. Where the can body has a conventional lock and lap seam, the lapped end sections of the seam tend to separate or open up when flanged so that leakage is liable to occur at these points in the completed can.

The full lock seam having interlocked body hooks extending the full length of the seam presents similar problems. The usual full lock seam contains four thicknesses of body stock which, as compared with the single thickness of the remainder of the body, requires a considerable flanging pressure. Also, since the four thicknesses are bent unequally when flanged, the cement layers bonding the four thicknesses tend to fracture and fail. Hence a loose and leaky seam sometimes results and difficulty is often encountered in applying closure members to the flanges.

Because of this flanging problem, it is generally desirable to preflange the portion of the body end which includes the end of the side seam while the bonding cement is in the heat-softened plastic state. When the heated seam is rolled in accordance with the method heretofore discussed, this preflanging operation would have to be performed as a separate subsequent step. Obviously such a procedure involving additional handling and processing steps would increase the time and costs of producing the can bodies.

Accordingly, an object of the present invention is to provide a method of forming a metal can body having a cemented lock side seam which will overcome the problems hereinbefore pointed out.

Another object is to provide such a method wherein the bonding material is uniformly distributed throughout the interlocked hook portions of the seam.

Another object is to provide such a method which produces a bonded side seam of uniform and maximum strength for a given bonding material.

A further object is to provide such a method wherein the body flanges in the region of the side seam are preformed simultaneously with the completion of the seam.

Still a further object is to provide such a method which is easily and simply accomplished.

Numerous other objects and advantages of the invention will be apparent as it is better understood from the following description, which, taken in connection with the accompanying drawings, discloses a preferred embodiment thereof.

Referring to the drawings.

Figure 1:
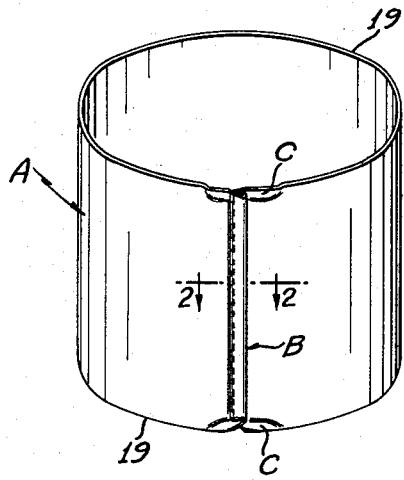
FIGURE 1 is a perspective view of a can body made in accordance with the method of the instant invention.
Figure 2:
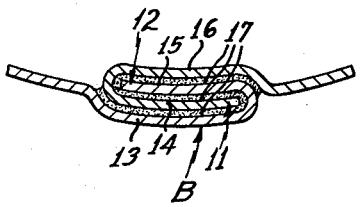
FIG. 2 is an enlarged sectional view taken substantially along a plane indicated by the line 2—2 of FIG. 1.

As a preferred or examplary embodiment of the present invention, the drawings illustrate a method of providing a tubular can body A (FIG. 1) having a longitudinally extending side seam B and outwardly directed preflanges C which extend transversely of the side seam B and project for a short distance on both sides thereof as best shown in FIG. 1. The side seam B has reversely disposed inner and outer hooks 11, 12 which are interfolded as shown in FIG. 2 to provide a lock seam having four thicknesses of layers 13, 14, 15, 16 of body material hermetically bonded together by a bonding material 17 interposed between the layers.

Figure 3:
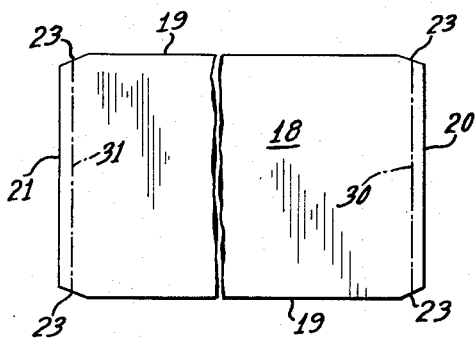
FIG. 3 is a plan view of a flat body blank from which the can body of FIG. 1 is made.

In the instant method, the can body A is made from a one-piece flat blank 18 (FIG. 3) of substantially rectangular configuration defined by horizontal edges 19 and vertical side seam edges 20, 21. The blank 18 is preferably but not necessarily provided with beveled corners 23 which extend inwardly from the longitudinal vertical side seam edges 20, 21 for a distance equal substantially to twice the width of the side seam B, and extend inwardly from the transverse horizontal edges 19 a lesser amount approximately equal to the width of the side seam. The beveled corners 23 result in a somewhat gradual thinning of the side seam B at the end portions thereof thereby facilitating the flanging of the can body end portions adjacent the seam and the attachment by double seaming of end closure members to the can body A.

A fluid composition containing the bonding material 17 is applied to pre-determined widths of both surfaces of the flat blank 18 adjacent the edges 20 and 21. Various types of fluid compositions may be used so long as they are sufficiently flowable to permit application and will dry or cool to produce a solid layer of bonding material 17 on the desired surfaces. For example, a rubber material may be applied in the form of a solution in a volatile organic solvent; and resinous bonding material may be applied in the form of an emulsion, solution, suspension, or in the melted condition.

Figure 4:
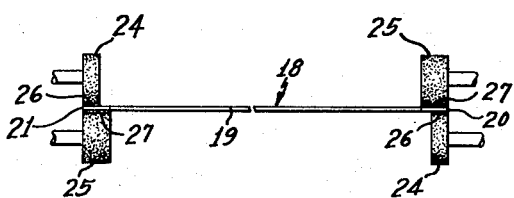
FIG. 4 is a front elevational view showing the fluid bonding material being applied to longitudinal edge portions of the blank of FIG. 3.

As shown in FIG. 4, the fluid composition is preferably applied by means of roller applicators 24, 25 arranged to simultaneously deposit layers 26, 27 of the fluid composition on the selected marginal edges of the flat blank 18. Other methods of applying the fluid composition such as by extrusion etc. would also be suitable. The layers 26, 27 may also be applied in the form of thin narrow strips of solid bonding material suitably adhered to the selected marginal edges of the blank 18. Preferably, the layers 26 have a width slightly less than the width of the seam B and the layers 27 have a width slightly less than twice the width of the seam so that substantially all of the surfaces which will be enclosed within the seam after it is made up have a preapplied layer of bonding material 17 thereon.

Figure 5:
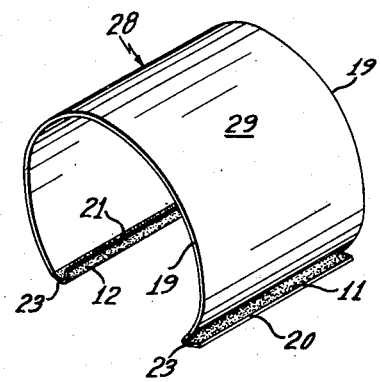
FIG. 5 is a perspective view of an unfinished tubular can body made from the blank of FIG. 3 showing opposed longitudinal edge portions reversely bent to form body hooks.

Depending upon the type of fluid composition used, the flat blank 18 is passed through a drying oven or similar equipment to evaporate the liquid carrier and leave a solid deposit of the bonding material 17, or the blank is cooled to solidify the layers 26, 27 of bonding material applied thereon. The flat blank is then bent into tubular shape to provide a partly completed can body 28 having a cylindrical body wall 29 (FIG. 5). A marginal portion adjacent the longitudinal edge 20 is bent along a line 30 to form the outwardly extending inner body hook 11 and a marginal portion adjacent the longitudinal edge 21 is bent along a line 31 to form the inwardly extending outer body hook 12.

Figure 6:
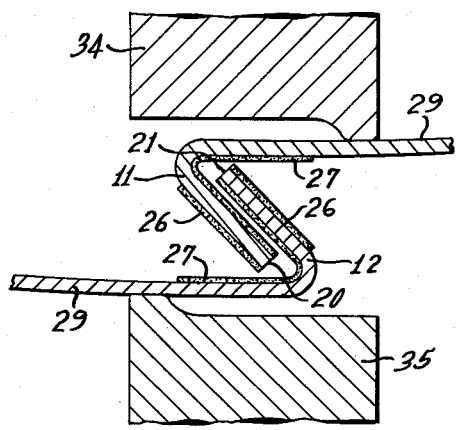
FIGURES 6 and 7 are enlarged transverse sectional views respectively showing the body hooks interengaged preparatory to the initial bumping operation and the body hooks interlocked at the completion of the initial bumping operation.
Figure 7:
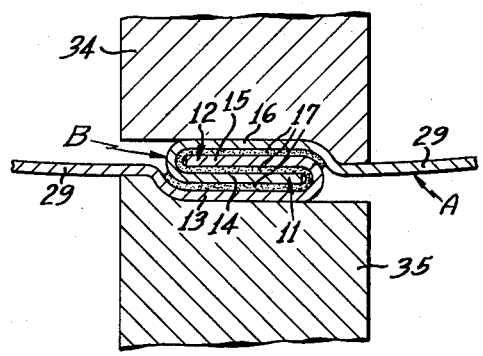

The opposed, reversely bent body hooks 11, 12 are next interengaged as seen in FIG. 6 with the body A expanded to proper size in the usual manner by expander cheeks on a horn (not shown). The interengaged hooks 11, 12 are then pressed together, or bumped, in order to form the lock side seam B consisting of the four interlocked layers of metal 13, 14, 15, 16 (FIG. 7). The operation can be performed in any suitable manner, as for example, by means of the opposed bumping elements 34 and 35 which may be the hammer and spline of a conventional can bodymaker. During this operation the layers 26, 27 of bonding material 17 are compressed together into essentially a continuous layer of material interposed between the four layers 13, 14, 15, 16 of the lock seam B. However, the solid bonding material 17 resists movement and consequently, in this stage of the formation of the seam B, the distribution of the bonding material within the seam may not be uniform or complete.

Figure 8:
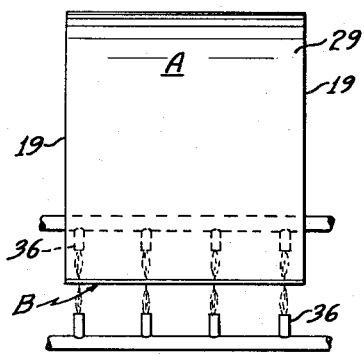
FIG. 8 is a side elevational view showing the body side seam being heated preparatory to the final bumping step.
Figure 9:
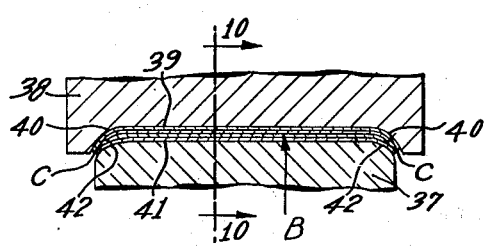
FIG. 9 is a sectional view through the spline and hammer illustrating the final bumping of the side seam and the simultaneous preflanging of portions of the ends of the body including the ends of the seam.

After the seam B has been thus bumped, the side seam area of the can body A is heated by bringing it adjacent suitable heating means such as the gas burners 36 (FIG. 8) which increases the fluidity of the bonding material 17 confined within the seam. Immediately thereafter and while the bonding material 17 is soft and tacky, the can body A is advanced to a final bumping station and the seam B bumped with a substantial predetermined force between a vertically reciprocable hammer 37 and a spline 38 (FIG. 9).

The spline 38 is carried by a horn (not shown) in the usual manner and has a flat central portion 39 and downwardly curved preflanging end faces 40. The hammer 37 similarly has a flat central portion 41 and downwardly curved preflanging end faces 42. The length of the flat portion 41 of the hammer 37 is less than the length of the can body A by an amount equal to the combined lengths of the preflanges C to be formed on the can body. The length of the flat portion 39 of the spline 38 is made somewhat greater than the length of the flat portion 41 of the hammer 37 so that the seam B is uniformly compressed between the continuous spline surface formed by the flat portion 39 and end faces 40 and the continuous hammer surface formed by the flat portion 41 and end faces 42 during the final bumping operation.

Figure 10:
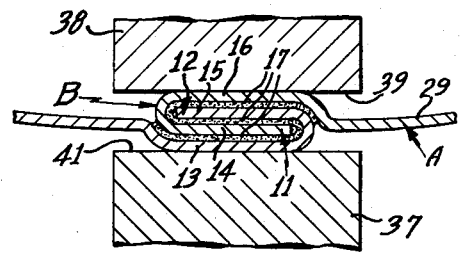
FIG. 10 is an enlarged sectional view taken substantially along line 10—10 of FIG. 9.

Preliminary to the final bumping operation, the hammer 37 is disposed in a substantially central location between the edges 19 of the can body A. As the hammer 37 is moved upwardly towards the spline 38, the interlocked hooks 11, 12 of the seam B are tightly compressed between the flat portion 39 and 41 of the spline and hammer respectively (FIG. 10) while the end portions of the seam B adjacent the edges 19 of the can body A are bent outwardly by the end faces 40 and 42 to produce the preflanges C (FIG. 9). The preflanges C extend transversely of the side seam B and project for a short distance on both sides thereof as shown in FIG. 1.

The magnitude of the bumping force required generally depends upon the characteristics of the particular bonding material such as its flow resistance in the heat-softened condition. For example, a rubber base cement heated to a temperature of 300–350° F. requires a bumping force of approximately 600 pounds per inch of seam to effect a good cement distribution throughout the seam. Other cements may require higher or lower values generally within the range of 500 to 1000 pounds per inch of seam length.

The compression of the seam B over its full length during the final bumping operation causes the bonding material 17 enclosed therein to be uniformly raised to a high pressure. Consequently, the bonding material 17 is forced to flow into and uniformly fill the spaces between the layers forming the seam B. At the same time, there is no undesirable tendency for the bonding material 17 to flow towards and build up within any particular portion of the side seam B. Furthermore, since the preflanges C which include the ends of the side seam B are formed during the final bumping operation while the bonding material 17 is soft and flowable, the seam portions of the preflanges are fully bonded and hermetically sealed by the bonding material flowing into and filling the spaces between the interlocked hooks 11, 12.

While the description of the subject method has been confined to the formation of a full lock seam with or without the clipped or beveled corners 23, it is to be understood that it is equally applicable to the formation of other types of cemented side seams such as a lock and lap type seam. Moreover, the subject method is particularly suited for producing seams such as the lock and lap type in which the thickness of the lock portion is different from the thickness of the lap portions because the bumping tools can be easily made to accommodate seams of varying thicknesses. On the other hand, a process in which the heated seam is rolled to effect an improved bonding cement distribution is generally practical only for seams having a uniform thickness over the complete seam length.

From the foregoing description, it will be seen that the present invention provides an efficient method of forming sheet metal can bodies having a cemented side seam. By the subject method, the cement is made to flow simultaneously and uniformly throughout all parts of the seam thereby producing a seam of uniform and maximum strength for a given cement material. Also, the side seam portions of the can body end may be preflanged as part of the seam forming operation in a manner which insures that the multiple layers of body stock forming the side seam will be maintained in tight engagement with one another while the cement is uniformly distributed between the layers to produce a hermetic seal.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of forming a tubular can body having a cemented side seam including interlocked hooked portions from a flat sheet metal blank comprising the steps of applying to predetermined widths of both marginal surfaces of said blank adjacent both longitudinal edges thereof which are to be joined in said side seam a fluid composition containing a heat-softenable bonding material, hardening said fluid composition to form thin solid deposits of said bonding material on said marginal surfaces, bending longitudinal edge portions of said blank to form reversely bent body hooks, shaping said blank into a partial tubular form, interengaging and bumping said body hooks to interlock the hooks and form a side seam with said bonding material confined wholly within said seam and between the parts to be joined, said bonding material covering substantially all of the contiguous surfaces of the interlocked body hooks, heating said seam to soften the bonding material enclosed therein, and bumping said heated seam with a predetermined force to press the seam parts into close engagement and simultaneously cause said softened bonding material to flow uniformly within and completely fill the interstices of said seam whereby all parts of said seam are fully bonded throughout to provide a strong hermetically sealed side seam on said body.

2. The method set forth in claim 1 wherein simultaneously with said bumping of said heated seam, portions of the ends of said tubular body including the ends of said side seam are bent outwardly to form partial end flanges on said body.

3. The method set forth in claim 1 wherein said heated seam is bumped with a force of at least 500 pounds per lineal inch of seam.

4. The method set forth in claim 1 wherein said side seam has short lap portions at the ends thereof, said predetermined marginal surfaces including the contiguous surfaces of said lap portions.

5. The method set forth in claim 1 wherein said composition consists essentially of at least one rubber polymer dissolved in a volatile organic solvent therefor, said solvent being subsequently removed by evaporation to leave a thin dry film of said rubber on said predetermined marginal surfaces.

References Cited in the file of this patent

UNITED STATES PATENTS

| | | |
|---|---|---|
| 370,404 | Norton | Sept. 27, 1887 |
| 834,467 | Grafton | Oct. 30, 1906 |
| 2,288,182 | Curtin | June 30, 1942 |
| 2,346,619 | Schroder | Apr. 11, 1944 |
| 2,801,648 | Anderson et al. | Aug. 6, 1957 |